United States Patent
Foegler et al.

(10) Patent No.: US 9,532,577 B2
(45) Date of Patent: Jan. 3, 2017

(54) FLEXIBLE TUBULAR FOOD CASING COATED WITH MELTABLE, THERMOPLASTIC POLYMERS

(75) Inventors: Jens Foegler, Taunusstein (DE); Michael Seelgen, Idstein (DE); Ulrich Delius, Frankfurt (DE)

(73) Assignee: Kalle GmbH, Wiesbaden (DE)

( * ) Notice: Subject to any disclaimer, the term of this patent is extended or adjusted under 35 U.S.C. 154(b) by 414 days.

(21) Appl. No.: 13/031,881

(22) Filed: Feb. 22, 2011

(65) Prior Publication Data
US 2011/0236539 A1   Sep. 29, 2011

(30) Foreign Application Priority Data
Mar. 25, 2010  (DE) .......................... 10 2010 012 633

(51) Int. Cl.
*A22C 13/00* (2006.01)
(52) U.S. Cl.
CPC ... *A22C 13/0013* (2013.01); *A22C 2013/0053* (2013.01); *A22C 2013/0059* (2013.01); *A22C 2013/0093* (2013.01); *Y10T 428/1324* (2015.01)
(58) Field of Classification Search
CPC .................................................. A22C 13/0013
USPC .. 426/34.1, 34.3, 34.8, 105, 135; 138/118.1; 428/34.1, 34.3, 34.8; 427/207.1
See application file for complete search history.

(56) References Cited

U.S. PATENT DOCUMENTS

| 3,922,398 A | 11/1975 | Bridgeford et al. |
| 5,273,482 A | 12/1993 | Beckman et al. |
| 2004/0253398 A1 | 12/2004 | Mintz |
| 2006/0234611 A1* | 10/2006 | Delius et al. ................... 452/32 |
| 2008/0069985 A1* | 3/2008 | Seelgen et al. .............. 428/34.3 |
| 2009/0191315 A1* | 7/2009 | Delius .......................... 426/105 |

FOREIGN PATENT DOCUMENTS

| DE | 31 47 519 A1 | 7/1983 |
| DE | 37 04 563 C2 | 8/1988 |
| DE | 0 904 700 A1 | 3/1999 |
| DE | 10 2004 048 057 A1 | 4/2006 |
| EP | 0 060 926 A1 | 9/1982 |

OTHER PUBLICATIONS

Din Deutsches Institut Für Normung E.V.: DIN EN ISO 1133 "Determination of the melt mass-flow rate (MFR) and the melt volume-flow rate (MVR) of thermoplastics", (February Feb. 2000) Berlin, Germany XP002699736.

* cited by examiner

*Primary Examiner* — Vera Stulii
(74) *Attorney, Agent, or Firm* — ProPat, L.L.C.

(57) ABSTRACT

A flexible tubular food casing having a flat support material is provided which, on at least one side, has a continuous coating based on a hotmelt polymer, with the coating preferably situated on the outside. The continuous coating has a weight per unit area of 3 to 200 g/m$^2$, preferably 15 to 50 g/m$^2$. The hotmelt polymers have an MVR value in the range of about 25 to 500 cm$^3$ per 10 min, measured at 190° C. with a load of 2.16 kg. The flexible tubular food casing is suitable as a synthetic sausage casing for raw sausage, scalded-emulsion sausage or cooked-meat sausage.

21 Claims, No Drawings

FLEXIBLE TUBULAR FOOD CASING COATED WITH MELTABLE, THERMOPLASTIC POLYMERS

CROSS-REFERENCE TO RELATED APPLICATIONS

This application claims priority to German Patent Application 10 2010 012 633.0 filed Mar. 25, 2010 which is hereby incorporated herein by reference in its entirety.

FIELD OF THE INVENTION

The invention relates to a flexible tubular food casing having a flat, fibrous support material which is coated with a thermoplastic. The food casing is provided in particular as a synthetic sausage casing.

BACKGROUND OF THE INVENTION

Flexible tubular food casings of the type mentioned at the outset are known and copiously described. They are produced by coating a fibrous support material, in particular a textile support material. Coating is generally performed using aqueous dispersions. Frequently, in this process, acrylic dispersions are used Such casings having a textile support material and coated with acrylic dispersions are described, for example, in DE 37 04 563 C2, whose United States equivalent is U.S. Pat. No 5,246,750, and in DE 31 47 519, whose United States equivalent is U.S. Pat. No. 4,525, 418. After coating, customarily, a drying step follows. In further processing steps, the coated support materials are finally processed by stitching, gluing, sealing, or in other customary ways, to form flexible tubular casings.

Cellulose fiber skins having a PVDC inner coating are also known (see, for example, EP 0 904 700 A1, whose United States equivalent is United States Patent Publication No 2001/0048986). The inner coating is produced using an aqueous dispersion of a vinylidene chloride copolymer. Cellulose fiber skins contain a reinforcement of a fiber paper, in particular a paper made of hemp fibers or abaca fibers. A drying step is necessarily associated with the coating.

Finally, flexible tubular textile skins are also known, on the full surface of the inside of which a film made of thermoplastic sealable or weldable plastic is applied in layer form or laminated (DE 10 2004 048 057 A1). The film can consist of polyester, polyamide, polyolefin or other thermoplastics. They can be stretched or unstretched. The connection between the film and the textile support material is not satisfactory in all cases, however, since the polymers of the film do not enclose the fibers.

The dispersions used in dispersion coating generally contain 50 to 60% by weight of solid, the remainder consists essentially of water. Therefore, during the drying, a considerable amount of water must be evaporated off. This is highly energy consuming and expensive. In addition, dryers having a great length are required therefor. As a result, a high space requirement for such a dispersion coating plant is required. In addition, for operating such a plant, a plurality of persons are required. The coating dispersions must be made up before coating according to a defined formula. For this purpose, personnel are also required. Likewise, owing to the dispersion batch and the drying, environmental pollution is caused.

SUMMARY OF ADVANTAGEOUS EMBODIMENTS OF THE INVENTION

It is an object of the invention to develop a casing which markedly reduces the abovementioned disadvantages of the current prior art. In particular, during production, drying should no longer be required. This decreases the expenditure in terms of apparatus and saves energy.

It has now been found that the coating made of a thermoplastic may be implemented in a significantly better manner using hotmelt polymers than using an aqueous polymer dispersion or a film made of thermoplastic polymers.

DETAILED DESCRIPTION OF ADVANTAGEOUS EMBODIMENTS OF THE INVENTION

The present invention therefore relates to a food casing having a flat support material and a continuous, i.e. a full-surface coating which is situated thereon and is made of a linear thermoplastic polymer, which is characterized in that the coating, as an essential component, comprises at least one hotmelt polymer.

In the context of the present invention, polymers called hotmelt polymers are those having a melt flow index (=melt volume-flow rate index (MVR)) in the range from 25 to 500 $cm^3$ per 10 min, measured at 190° C. with a load of 2.16 kg as specified in DIN 1133. Hotmelt polymers are therefore markedly "less viscous" under the action of heat and loading than customary thermoplastic polymers that are used, for example, for plastics films. The MVR may even be determined, on the finished casing.

The hotmelt polymers form the substantial component of the coating, i.e. their fraction is preferably at least 50% by weight, particularly preferably at least 75% by weight, especially at least 90% by weight, in each case based on the total weight of the coating. Types having a hotmelt polymer component of 100% are likewise possible.

When hotmelt polymers are used instead of aqueous polymer dispersions, the drying step is dispensed with. The food casings may therefore be produced at a higher machine speed. Production costs, plant costs, personnel costs and environmental costs are thereby markedly reduced.

As starting material for producing the flexible tubular casing, the most varied materials can be used:

The support material comprises as base material a woven fabric, knitted fabric, paper, consolidated nonwoven or spun bonded nonwoven made of natural fiber, synthetic fibers or mixtures thereof.

Suitable natural fibers are, for example, cotton fibers, cellulose fibers (e.g. linen), wool or silk. Materials derived from biopolymers can also be processed to suitable fibers. Here, for example, fibers made of regenerated cellulose (=viscose) may be mentioned. Suitable synthetic fibers are, for example, produced from polyamide, polyester, polyolefin (especially polypropylene), poly(vinyl acetate), polyacrylonitrile, poly(vinyl chloride), poly(vinylidene chloride), or from the corresponding copolymers. The thickness, or the weight per unit area, and also the choice of material of the support material is dependent on the later use In general, the weight per unit area of the support material is between 3 and 400 $g/m^2$, preferably 10 to 130 $g/m^2$, such as 20 to 130 $g/m^2$, and more particularly 12 to 75 $g/m^2$. The weight per unit area is preferably dimensioned or selected such that the support material is self-supporting.

These support materials are coated with meltable polymers, which are termed hotmelts. These hotmelts occur, for example, as granules, cartridges or blocks and are melted at defined temperatures. The melting occurs preferably in an extruder, tank melter or barrel melter. The molten media are preferably fed via a pump (e.g. gearwheel pump) to a coating appliance. The following systems can be used, for example, as a coating system: nozzle application (contact or curtain), roller application, spray application, etc. In the contact application there is material contact between the nozzle lip and support material. In curtain coating, a wide-slot nozzle is mounted at a certain distance from the support material, the hotmelt flows down out of the nozzle like a "curtain", through which the support material is passed. There is therefore no contact between the support material and nozzle. Completely heated systems are required for the hotmelt coating. The support material is generally only coated on one side.

The hotmelts are based on linear (co)polymers which, in contrast to the better or more widely known polymers conventionally called "thermoplastics," have low viscosities in the melt. The viscosity can be reported, e.g., as what is termed melt volume flow rate ("MVR", measurement is performed as specified in DIN 1133). MVR values in the range from 25 to 500 $cm^3$ per 10 min, measured at 190° C. at a load of 2.16 kg, are typical of hotmelts, whereas (low-melting) thermoplastics have values in the range from 5 to 25 $cm^3$ per 10 min (measured under the same conditions). Preferably, the MVR value of the hotmelt polymers of the present invention is in the range from 100 to 450 $cm^3$ per 10 min, particularly preferably in the range from 150 to 400 $cm^3$ per 10 min, in each case measured as specified in DIN 1133 at 190° C. and a load of 2.16 kg. The hotmelt polymers therefore penetrate into the textile support material, enclose individual fibers (partly or completely), even in the interior of the support material, and fill the space between the fibers more or less completely. A laminated film, in contrast, is only bonded to the surface of the textile support material.

For delimiting the hotmelt polymers from conventional thermoplastics, here polyamide thermoplastics may be mentioned such as are used for extruded films. In the case of the latter the MVR—also owing to their higher melting points—is measured under other conditions, customarily at 275° C. and 10 kg loading. This typically gives MVR values in the range of 40 to 200 $cm^3$ per 10 min. Hotmelt polymers under these conditions would scarcely be measurable, since the flow velocity thereof is then extremely high and exact volume determination would no longer be possible.

Hotmelt polymers which are suitable for coating are, for example: polyesters, copolyesters, polyolefins, preferably polyethylene (especially HD-PE, MD-PE or LD-PE) or polypropylene, ethylene/vinyl acetate copolymers, acetal (co)polymers such as, for example, polyvinylbutyral, polyamides, copolyamides, vinylidene chloride copolymers ("PVDC"), meltable polyurethanes (PUR), the latter also as a reactive system, i.e. chemically crosslinked. The (co) polyamides are preferably aliphatic.

The hotmelts can contain these polymers individually or as a mixture. In small amounts, in addition, customary additives can be present such as heat stabilizers, flow enhancers, adhesion improvers, fillers and color pigments.

In the coating, or in the coatings, no regenerated or precipitated cellulose is present, but cellulose powder can be present as filler in minor amounts (<5% by weight, based on the weight of the layer).

The hotmelts are applied on the full surface of the support material, and so a continuous coating forms. The application weights in this case are generally between 3 and 200 $g/m^2$, preferably between 15 and 100 $g/m^2$, particularly preferably between 25 and 60 $g/m^2$. The later properties of the casing can be adjusted by the selection of the coating media. In the case of raw sausage application, the water vapor permeability is expediently 1000 to 1500 $g/m^2$ d, preferably 1200 to 1400 $g/m^2$ d, the oxygen permeability is expediently 20 to 150 $cm^3/m^2$ d, preferably 35 to 50 $cm^3/m^2$ d. In the cooked-meat sausage and/or scalded-emulsion sausage applications, the water vapor permeability is expediently about 1 to 50 $g/m^2$ d, preferably about 5 to 40 $g/m^2$ d, and the oxygen permeability is 20 to 100 $cm^3/m^2$ d, preferably 30 to 80 $cm^3/m^2$ d.

The coating media are preferably applied on the outside. However, application on the inside or the inside and outside is also possible. In the preferred embodiment, only one hotmelt layer is applied to the support material. A plurality of hotmelts of the same or different composition can also be applied one after the other, and so the coating comprises a plurality of layers.

In the case of coating with two or more layers (in the context of the present invention, termed "multilayer" casing), the selection of the coating products can determine the property profile of the casing. Thus, it is possible for example, first to coat the support with a first layer of a polyamide to achieve a low oxygen permeability and, in the second layer, to coat it with a polyolefin to achieve a high water vapor tightness. In the casing according to the invention, a hotmelt coating is situated directly on at least one side of the fibrous support material. Further layers in the case of the multilayer casing can be hotmelt layers, but these can be generated from another material and/or in another manner, for example by dispersion coating or laminating on a film.

The coating melt is applied to the surface of the support material. Depending on the combination of coating medium and support material, it may be necessary to improve the bond adhesion between the support material and hotmelt. This can be performed, for example, by applying a reduced pressure. In this case the reduced pressure is generated below the point at which the coating meets the support web. The still-liquid coating is thereby drawn by reduced pressure onto and into the support material. At the same time, any air cushions are eliminated. A further possibility for improving the bond adhesion is via preheating the support material. In this case the support material is heated directly before the hotmelt application, which reduces the temperature difference between the melt and support. Solidification of the hotmelt on the support surface is thereby delayed and mechanical anchoring promoted.

A further possibility for affecting the surface properties (e.g. tightness, adhesion) can be calendering. In calendering, the composite of support and coating are pressed to one another, optionally with warming or heating. Calendering of the composite is possible using the residual heat from the hotmelt application. Also, calendering can proceed after cooling of the coating medium. The calendering result can be affected by pressure, temperature, velocity, or a combination of said parameters.

A further possibility for improving the bond adhesion, for example in the case of woven viscose fabrics, is impregnation with a contacting agent. The contacting agent is forced into the interstices of the woven fabric and serves as adhesion promoter for the hotmelt polymers. The contacting agent is applied in a small amount compared with the weight of the hotmelt polymers. It does not form a continuous coating. The porous, fibrous structure of the support material is retained in this case.

In addition, there is the possibility of providing the support material with an adhesion promoter in order to achieve improved adhesion of the hotmelt to the support web.

A further possibility for enhancing the bond adhesion is by desizing the woven fabric. The sizing agent, frequently starch or a starch derivative, is removed in this case in an aqueous bath.

The support web is expediently coated in the flat state. In further processing steps, a flat good is sliced into individual blanks and then glued, stitched, welded, sealed or permanently joined together in another way to form a casing in a linear or any desired shape (e.g. in the shape of what is termed a "fat end" or provided with a wavy or curved seam). For improving the optical appearance, the coated textile support material can be stitched.

In a further embodiment, the support material is coated in a ring-die nozzle. In this case the support material, before the coating, is shaped to form a flexible tube over a shaping shoulder, glued with the coating hotmelt and then coated.

The food casing according to the invention can be finally processed to form shirred sticks. It can additionally be finally processed to sections which are closed at one end by a clip, clip with loop, by tying, by knotting, by gluing, by sealing, welding, stitching with a linear or curved seam or by a combination of a plurality of said types of closure.

For achieving a colored coating, the hotmelt can be produced in the appropriate color. A further possibility of coloring can be by adding colored granules to the coating granules. In addition, the use of a dyed support material is possible.

The uncoated side of the support material can be coated, or impregnated, for example with solid and/or liquid media, which transfer flavor, color and/or taste to the sausage. Those which may be mentioned in particular in this context are liquid smoke and dry smoke.

In a further embodiment, the first coat can be applied as a hotmelt coating in order, for example, to generate water tightness. One or more further coat(s), for example for achieving a defined water vapor permeability or oxygen permeability, can thereafter be applied by a dispersion coating.

The food casing according to the invention is provided, in particular, as a synthetic sausage casing, especially for raw sausage, scalded-emulsion sausage or cooked-meat sausage.

The examples hereinafter serve to illustrate the invention. Percentages therein are taken to mean percentages by weight, unless stated otherwise or is immediately clear from the context.

Example 1

A woven viscose fabric having a weight per unit area of 80 g/m$^2$ was coated with a polyester hotmelt (MVR: 50 cm$^3$ per 10 min at a temperature of 190° C. and a load of 2.16 kg, determined as specified in DIN 1133; melt viscosity at 190° C.: 175 000 mPa s; density: 0.97 g/cm$^3$). The hotmelt was applied by nozzle coating at 200° C. The weight of the hotmelt coating was 30 g/m$^2$. The bond adhesion between the hotmelt and support material was very good. The flat good was sliced to a width of 200 mm and then glued to form a flexible tube. The casing was stuffed with liver sausage emulsion. After stuffing, the sausage had a caliber of 63 mm. The casing and the stuffed sausage was processed via all processes (stuffing, clipping, cooking, packaging) without defect.

Example 2

A woven polyester fabric having a weight per unit area of 67 g/m$^2$ was coated with molten PVDC hotmelt granules (melt temperature 160° C.; melt viscosity at 175° C.: 750 000 mPa s; density: 1.7 g/cm$^3$). The application weight was 42 g/m$^2$. This gave a total weight of 109 g/m$^2$. The water vapor permeability and oxygen permeability were determined on one sample. The water vapor permeability was 10 g/m$^2$ d, and the oxygen permeability was 65 cm$^3$/m$^2$ d. The flat web was sliced and glued to form a flexible tube having a diameter of 58 mm. The casing was stuffed with a fine liver sausage emulsion. The weight loss after boiling was 1.5%.

That which is claimed:

1. A single-layer or multilayer flexible tubular food casing comprising a coated, flat, textile support material comprising fibers, wherein the coating is a continuous layer comprising at least one linear hotmelt polymer having an MVR value in the range from 25 to 500 cm$^3$ per 10 min, measured at 190° C. at a loading of 2.16 kg;

said continuous coating layer applied directly onto the full surface of said support material, with individual fibers partly or completely enclosed by hotmelt polymer that penetrated into the textile support material, and said hotmelt polymer is polyester, polyolefin, polyvinylbutyral, polyamide, PVDC or a mixture thereof.

2. The food casing as claimed in claim 1, wherein the hotmelt polymer has an MVR value in the range from 100 to 450 cm$^3$ per 10 min, measured at 190° C. at a loading of 2.16 kg.

3. The food casing as claimed in claim 1, wherein the hotmelt polymer has an MVR value m the range from 150 to 400 cm$^3$ per 10 min, measured at 190° C. at a loading of 2.16 kg, and the hotmelt polymer comprises polyolefin selected from HD-PE, MD-PE, LD-PE or polypropylene.

4. The food casing as claimed in claim 1, wherein the support material comprises natural fibers and/or synthetic fibers.

5. The food casing as claimed in claim 1, wherein the support material comprises a woven fabric, knitted fabric or nonwoven thrilled from natural fibers, synthetic fibers or a mixture thereof.

6. The food casing as claimed in claim 1, wherein the support material comprises nonwoven selected from consolidated nonwoven or spun bonded nonwoven.

7. The food casing as claimed in claim 1, wherein the support material comprises natural fibers and/or synthetic fibers formed from cotton, viscose, regenerated cellulose, silk, polyester, polyamide, polyolefin, paper, poly(vinyl acetate), polyacrylonitrile, poly(vinyl chloride), corresponding copolymers thereof or a mixture thereof.

8. The food casing as claimed in claim 1, wherein the support material has a weight per unit area of 3 to 400 g/m$^2$, the hotmelt polymer is applied at a weight ranging between 3 and 200 g/m$^2$ and the water vapor permeability of the resulting casing ranges from 1000 to 1500 g/m$^2$d for raw sausage applications and from 1 to 50 g/m$^2$d for cooked-meat sausage and/or scalded-emulsion sausage applications.

9. The food casing as claimed in claim 1, wherein the support material has a weight per unit area of 10 to 130 g/m$^2$.

10. The food casing as claimed in claim 1, wherein the support material has a weight per unit area of 12 to 75 g/m$^2$.

11. The food casing as claimed in claim 1, wherein said easing has been shined to form a shirred stick or formed into sections which are closed at one end by a closure selected from a clip, clip with loop, a tie, knots, gluing, sealing, welding, stitching with a linear or bent seam, or by a combination of a plurality of said closures.

12. A single-layer or multilayer flexible tubular food casing comprising a coated, flat, textile support material comprising fibers, wherein the coating comprises at least one linear hotmelt polymer having an MVR value in the range from greater than 25 to 500 cm³ per 10 min, measured at 190° C. at a loading of 2.16 kg, applied directly onto the full surface of said support material, with individual fibers partly or completely enclosed by hotmelt polymer that penetrated into the textile support material, and wherein said casing comprises a glued, stitched or welded seam in linear or other form.

13. The food casing as claimed in claim 1, wherein an uncoated side of the support material is impregnated with at least one solid and/or liquid medium which transfers flavor, color and/or taste to a sausage within the food casing.

14. The food casing as claimed in claim 1, wherein an uncoated side of the support material is impregnated with liquid smoke or dry smoke.

15. The food casing as claimed in claim 1, wherein (i) the support material is colored with dyes or color pigments, or (ii) the support material is uncolored and has a colored coating.

16. The food casing as claimed in claim 1, wherein said food casing comprises one or more layers having barrier properties for oxygen and/or water vapor.

17. The food casing as claimed in claim 1, wherein said food casing has an impregnation or coating on an inside surface which controls adhesion between the casing and a food situated in the casing.

18. A process for producing a food casing as claimed in claim 1, said method comprising, preheating the support material for improving the bond strength and/or exposing the support material to reduced pressure and/or desizing die support material and/or applying an adhesion promoter and/or calendering the composite.

19. Raw sausage, scalded-emulsion sausage or cooked-meat sausage comprising a food casing as claimed in claim 1.

20. The food casing as claimed in claim 1, wherein said support material is a woven fabric having interstices that are impregnated with a contacting agent that promotes adhesion to the hotmelt polymer and said hotmelt polymer consists essentially of polyester, polyolefin, polyvinylbutyral, polyamide, PVDC or a mixture thereof.

21. The food casing as claimed in claim 1, wherein said continuous coating layer applied directly onto the full surface of said support material consists of liquid hotmelt polymer.

* * * * *

UNITED STATES PATENT AND TRADEMARK OFFICE
CERTIFICATE OF CORRECTION

| | | |
|---|---|---|
| PATENT NO. | : 9,532,577 B2 | Page 1 of 1 |
| APPLICATION NO. | : 13/031881 | |
| DATED | : February 22, 2011 | |
| INVENTOR(S) | : Foegler et al. | |

It is certified that error appears in the above-identified patent and that said Letters Patent is hereby corrected as shown below:

On the Title Page

Item [56], References Cited, FOREIGN PATENT DOCUMENTS
delete "DE 0 904 700 A1 3/1999" and insert --EP 0 904 700 A1 3/1999--

In the Claims

Column 6
Claim 5, Line 37, delete "thrilled" insert --formed--
Claim 11, Line 60, delete "easing" insert --casing--

Column 8
Claim 18, Line 8, delete "die" insert --the--

Signed and Sealed this
Twenty-eighth Day of February, 2017

Michelle K. Lee
*Director of the United States Patent and Trademark Office*